9094X
L. Yale,
Saw-Mill Head-Block,
Patented Sept. 11, 1835.
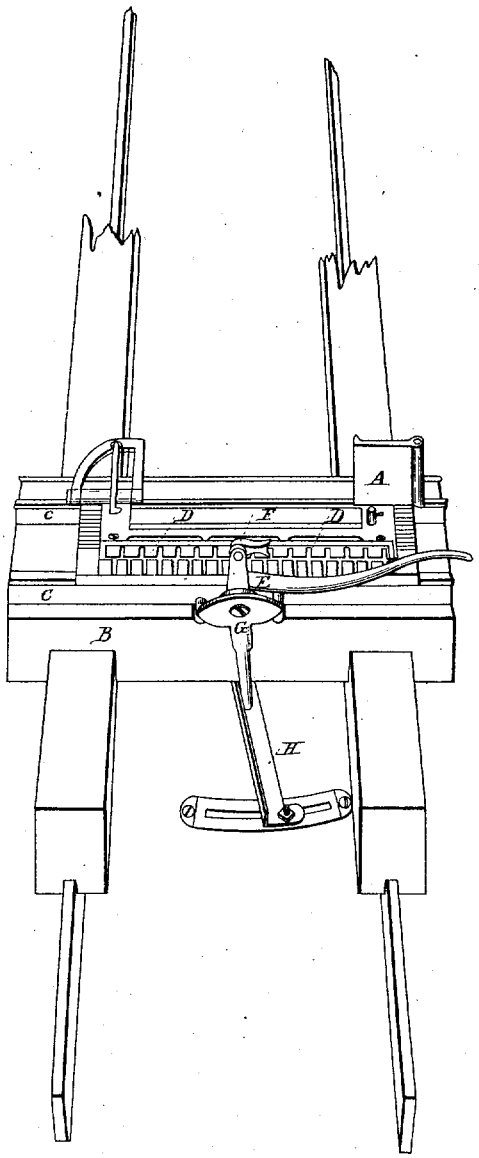
AM. PHOTO-LITHO. CO. N.Y. (OSBORNE'S PROCESS)

av 13

9094X

Sept 11. 1835 241.

Linus Yale. of Utica in the County of Oneida and State of New York

Letters Patent

The schedule referred to in these Letters Patent and making a
part of the same. Containing a description in the words of the
said Linus Yale, himself of his improvement in the Saw Mill:

To all to whom these presents shall Come.
Be it known that I Linus Yale, of Utica in the County of Oneida
and State of New York, have invented a New and useful im=
provement in the "Saw Mill" Called the self setting dog and
block, and that the following is a full and exact descrip=
tion of the construction and operation - - - - - - of the said
Machine, as invented or improved by me. Upon that portion of the plank or piece of timber that
is to form the body of the block I bolt on a plate of Cast iron
on the top, This plate is to contain the two rails through the whole
length thereof, projecting sufficiently high or above it to
admit of the two inner sides being sloped, or dovetailed, so as to
admit another plate having the sides sloped in a similar manner,
to slide backwards or forwards as desired between them. One of these dovetailed
ribs is to be placed flush with the side of the block, and the other at the
distance from it, intended for the width of the sliding piece, and
this plate and ribs are cast in one, Upon the top of this sliding
piece and over the rib which is flush with the side of the block,
is to be placed a bar of Iron of a square form say about one and
a half inches square, and is to be graduated or divided into different
distances on each of the four sides so as to allow of cutting various
sized boards, according as their distances are laid off - each side to
be regularly divided throughout and the Notches or grooves will
be sufficiently deep to form as it were Cogs, as upon a Common
rack; the bar to be about three feet long and to have at each end
a round tenon to fall into a hole for that purpose between the ears
of two pieces rising on the top of each end of the sliding piece so as

9094X to hold it fast, and yet to be moveable at pleasure when it is desired to change the side in order to cut or saw to a different thickness. At one end of the sliding plate is placed a dog which I construct to turn or revolve upon a vertical shaft, so that the dog is formed by, as it were an arm of any height and length desired; having at one end a hole to fit on said upright, & at the other a perpendicular row of teeth, or in a line parallel with the shaft, revolving round the shaft as its centre; behind the end containing the teeth or between them and the bar, I place a small knob or projection, also vertical, intended as a stay or support, so as to drop in a      between it and the back of the dog teeth when driven into the log in order to keep all firm. About midway of the block and against that side with which the bar is flush, I secure the end of a lever bent up at an elbow, or right angle; by means of a hole through it at said elbow for the passage of a pin, or pivot made fast to the side of the block and upon which this lever revolves. The elbow or short arm, has at its top a hole formed through it just above the top of the bar which it reaches intended to receive a pin to project horizontally over the bar, upon this pin revolves a hand of about four inches long having at one end a hole to pass on to the pin; and at the other a sharp angular projection on each side, intended to drop into the grooves or cogs formed on the bar, so that it will catch when laid upon either side upon the bar so as to force it forwards or backwards as the lever may be worked. Beneath the lever is to be suspended a small arm of about twelve inches in length, by means of a hole at one end of it, by which it is hung on the same pin or pivot, that passes through the elbow of the lever, & the other end is rounded to a point intended to work against the inclined plane below, and close beneath the pivot, there are formed on this arm two cross arms, or horns at right angles projecting about three and a half or four inches each way and in the same plane as the lever.

Through the end of each cross arm a small pin projects under the lever horizontally and at right angles with the cross arm; intended hen brought in contact with the lever, to raise it by means of the
ins under it. Directly under this arm & at the bottom of the Carriage
s secured the inclined plane, which consists of a flat bar of
ron of about four feet long, having at each end a hole to recei=
e a pin or bolt. One of these secures the bar to the floor, but
till allows it to play or revolve on it as a Centre; the other
in is intended to pass through the flat bar and drop into holes
ormed in the bottom of the floor or into a quadrangular slot
n which the bolt is secured by a nut in the circle described by the
ar in swinging on the first pivot so as to be secured at any
inclination desired and still to be moveable at pleasure.
These holes are at distances to correspond with those in the
notched bar. The inclined plane has one side at each end
rounded off so as to meet the other side in a sharp edge
like a Chisel edge, and these edges are placed on opposite sides
so that the round pointed Arm strikes against one rounded edge
as the plane moves on under it, & is thereby compelled to
follow this side on until the board is cut in the whole length
when the arm drops into a perpendicular again and is met by
the other rounded edge at that end of the plane & follows on at
that inclination as the Carriage runs back until it returns to the
first edge & so on. In running back, the pin at the end of the
cross arm under the lever raises it by means of the elevation
produced by the lateral motion of the pointed arm as it is forced
to one side by the inclined plane in passing it & this elevation
of the lever forces the small arm forward, and with it the hand
which consequently advances the cog or notch in which it rests. &
with it the dog and log for a fresh Cut. This description is applied
to the tail block - that at the head has no inclined plane nor
consequently any small pointed or setting arm, but in order to set
it there the lever is raised by hand and after the sawing is finish
=ed the hand is reversed and then by working the lever by hand
the dogs are brought back to the proper situation to start afresh.

9094X

What I claim as my invention and not before used in the above described Machine is not the use of the lever, nor the sliding motion of the piece containing the dog and bar but first the dogs swinging upon a vertical shaft as described. Second the construction and use of the Notched bar as set forth & for that intent.- Third the constuction and use of the pointed or setting arm as set forth- Fourth, the manner in which I construct the inclined plane as set forth, (but not the use of it) as an inclined plane of an entirely different mode of operation has been used. Fifth, the manner of casting the plates and slides together as shewn forth.

In Testimony that the above is a full and exact description of the Constuction and use of my improvement as invented by me I have hereunto set my hand this twentieth day of June in the year Eighteen hundred and thirty five.

Linus Yale

Witnesses
Isaac D. Kirk
Henry Stone (Drawing)

Ex.d H.G.C. (Patented September 11. 1835) X/443